(12) United States Patent
Gregg et al.

(10) Patent No.: US 9,298,659 B2
(45) Date of Patent: *Mar. 29, 2016

(54) INPUT/OUTPUT (I/O) EXPANSION RESPONSE PROCESSING IN A PERIPHERAL COMPONENT INTERCONNECT EXPRESS (PCIE) ENVIRONMENT

(71) Applicant: International Business Machines Corporation, Armonk, NY (US)

(72) Inventors: Thomas A. Gregg, Highland, NY (US); David F. Craddock, New Paltz, NY (US); Eric N. Lais, Tillson, NY (US)

(73) Assignee: International Business Machines Corporation, Armonk, NY (US)

( * ) Notice: Subject to any disclaimer, the term of this patent is extended or adjusted under 35 U.S.C. 154(b) by 574 days.

This patent is subject to a terminal disclaimer.

(21) Appl. No.: 13/674,982

(22) Filed: Nov. 13, 2012

(65) Prior Publication Data

US 2013/0073766 A1    Mar. 21, 2013

Related U.S. Application Data

(63) Continuation of application No. 12/821,239, filed on Jun. 23, 2010, now Pat. No. 8,918,573.

(51) Int. Cl.
  *G06F 13/00*    (2006.01)
  *G06F 13/40*    (2006.01)
  (Continued)

(52) U.S. Cl.
  CPC ............ *G06F 13/4027* (2013.01); *G06F 13/36* (2013.01); *G06F 13/385* (2013.01)

(58) Field of Classification Search
  CPC .... G06F 13/36; G06F 13/4027; G06F 13/385
  See application file for complete search history.

(56) References Cited

U.S. PATENT DOCUMENTS

| 4,104,539 A | 8/1978 | Hase |
| 4,170,472 A | 10/1979 | Olsen et al. |

(Continued)

FOREIGN PATENT DOCUMENTS

| CN | 1885096 A | 12/2006 |
| CN | 101196615 A | 6/2008 |

(Continued)

OTHER PUBLICATIONS

PCI Express Base Specification Rev 1.0a, Apr. 15, 2003, pp. 1-2, 31, 35, 36, 43, 44, 49-51, 55, 59-62, 74-75, 101.*

(Continued)

*Primary Examiner* — Nimesh G Patel
(74) *Attorney, Agent, or Firm* — Cantor Colburn LLP; Steven Chiu (57) ABSTRACT

Embodiments of the invention relate to non-standard input/output (I/O) adapters in a standardized I/O architecture. An aspect of the invention includes implementing non-standard I/O adapters in a standardized I/O architecture. A request is received at an I/O adapter from a requester to perform an operation on one of the I/O adapters. It is determined that the request is in a format other than a format supported by an I/O bus and that the requester requires a completion response for the request. The request is transformed into the format supported by the I/O bus, and is transmitted to the I/O adapter. The completion response is received from the I/O adapter, and includes an indicator that the request has been completed. The completion response is in the format supported by the I/O bus. The completion response is transmitted to the requester.

11 Claims, 7 Drawing Sheets

(51) Int. Cl.
  *G06F 13/38* (2006.01)
  *G06F 13/36* (2006.01)

(56) References Cited

U.S. PATENT DOCUMENTS

| | | |
|---|---|---|
| 4,282,274 A | 8/1981 | Mookherjee et al. |
| 4,611,319 A | 9/1986 | Naito |
| 4,644,443 A | 2/1987 | Swensen et al. |
| 5,027,254 A | 6/1991 | Corfits et al. |
| 5,170,472 A | 12/1992 | Cwiakala et al. |
| 5,282,274 A | 1/1994 | Liu |
| 5,430,856 A | 7/1995 | Kinoshita |
| 5,438,575 A | 8/1995 | Bertrand |
| 5,465,332 A | 11/1995 | Deloye et al. |
| 5,465,355 A | 11/1995 | Cook et al. |
| 5,535,352 A | 7/1996 | Bridges et al. |
| 5,551,013 A | 8/1996 | Beausoleil et al. |
| 5,568,365 A | 10/1996 | Hahn et al. |
| 5,574,873 A | 11/1996 | Davidian |
| 5,600,805 A | 2/1997 | Fredericks et al. |
| 5,617,554 A | 4/1997 | Alpert et al. |
| 5,663,919 A | 9/1997 | Shirley et al. |
| 5,719,647 A | 2/1998 | Fujikawa et al. |
| 5,742,785 A | 4/1998 | Stone et al. |
| 5,761,448 A | 6/1998 | Adamson et al. |
| 5,790,825 A | 8/1998 | Traut |
| 5,815,647 A | 9/1998 | Buckland et al. |
| 5,838,960 A | 11/1998 | Harriman, Jr. |
| 5,870,598 A | 2/1999 | White et al. |
| 5,949,646 A | 9/1999 | Lee et al. |
| 5,960,213 A | 9/1999 | Wilson |
| 5,963,425 A | 10/1999 | Chrysler et al. |
| 6,009,261 A | 12/1999 | Scalzi et al. |
| 6,023,736 A | 2/2000 | Lambeth et al. |
| 6,067,595 A | 5/2000 | Lindenstruth |
| 6,112,311 A | 8/2000 | Beardsley et al. |
| 6,205,530 B1 | 3/2001 | Kang |
| 6,233,693 B1 | 5/2001 | Berglund et al. |
| 6,301,133 B1 | 10/2001 | Cuadra et al. |
| 6,308,255 B1 | 10/2001 | Gorishek, IV et al. |
| 6,330,656 B1 | 12/2001 | Bealkowski et al. |
| 6,341,064 B1 | 1/2002 | Bradley |
| 6,349,380 B1 | 2/2002 | Shahidzadeh et al. |
| 6,362,942 B2 | 3/2002 | Drapkin et al. |
| 6,408,347 B1 | 6/2002 | Smith et al. |
| 6,456,498 B1 | 9/2002 | Larson et al. |
| 6,463,582 B1 | 10/2002 | Lethin et al. |
| 6,519,645 B2 | 2/2003 | Markos et al. |
| 6,523,140 B1 | 2/2003 | Arndt et al. |
| 6,529,978 B1 | 3/2003 | Eide et al. |
| 6,538,881 B1 | 3/2003 | Jeakins et al. |
| 6,544,311 B1 | 4/2003 | Walton et al. |
| 6,578,191 B1 | 6/2003 | Boehme et al. |
| 6,594,148 B1 | 7/2003 | Nguyen et al. |
| 6,595,018 B2 | 7/2003 | Goth et al. |
| 6,615,305 B1 | 9/2003 | Olesen et al. |
| 6,625,169 B1 | 9/2003 | Tofano |
| 6,625,648 B1 | 9/2003 | Schwaller et al. |
| 6,643,727 B1 | 11/2003 | Arndt et al. |
| 6,654,818 B1 | 11/2003 | Thurber |
| 6,658,599 B1 | 12/2003 | Linam et al. |
| 6,704,831 B1 | 3/2004 | Avery |
| 6,721,813 B2 | 4/2004 | Owen et al. |
| 6,721,839 B1 | 4/2004 | Bauman et al. |
| 6,772,264 B1 | 8/2004 | Dayan et al. |
| 6,816,590 B2 | 11/2004 | Pike et al. |
| 6,845,428 B1 | 1/2005 | Kedem |
| 6,845,469 B2 | 1/2005 | Hicks et al. |
| 6,901,537 B2 | 5/2005 | Dawkins et al. |
| 6,907,510 B2 | 6/2005 | Bennett et al. |
| 6,927,975 B2 | 8/2005 | Crippen et al. |
| 6,950,438 B1 | 9/2005 | Owen et al. |
| 6,963,940 B1 | 11/2005 | Glassen et al. |
| 6,970,992 B2 | 11/2005 | Gurumoorthy et al. |
| 6,973,510 B2 | 12/2005 | Arndt et al. |
| 6,978,338 B2 | 12/2005 | Wang et al. |
| 6,996,638 B2 | 2/2006 | Brice, Jr. et al. |
| 7,003,615 B2 | 2/2006 | Chui et al. |
| 7,004,233 B2 | 2/2006 | Hasegawa et al. |
| 7,007,099 B1 | 2/2006 | Donati et al. |
| 7,032,052 B2 | 4/2006 | Sauber et al. |
| 7,042,734 B2 | 5/2006 | Hensley et al. |
| 7,053,502 B2 | 5/2006 | Aihara et al. |
| 7,062,594 B1 | 6/2006 | Sardella et al. |
| 7,065,598 B2 | 6/2006 | Connor et al. |
| 7,075,788 B2 | 7/2006 | Larson et al. |
| 7,079,387 B2 | 7/2006 | Brooks et al. |
| 7,093,155 B2 | 8/2006 | Aoki |
| 7,096,308 B2 | 8/2006 | Main et al. |
| 7,103,808 B2 | 9/2006 | Kitamorn et al. |
| 7,107,331 B2 | 9/2006 | Gava et al. |
| 7,107,384 B1 | 9/2006 | Chen et al. |
| 7,107,495 B2 | 9/2006 | Kitamorn et al. |
| 7,127,599 B2 | 10/2006 | Brice, Jr. et al. |
| 7,130,938 B2 | 10/2006 | Brice, Jr. et al. |
| 7,134,040 B2 | 11/2006 | Ayres |
| 7,139,940 B2 | 11/2006 | Arbeitman et al. |
| 7,152,136 B1 | 12/2006 | Charagulla |
| 7,163,546 B2 | 1/2007 | Mirizzi et al. |
| 7,174,550 B2 | 2/2007 | Brice, Jr. et al. |
| 7,177,961 B2 | 2/2007 | Brice, Jr. et al. |
| 7,200,704 B2 | 4/2007 | Njoku et al. |
| 7,206,946 B2 | 4/2007 | Sakakibara et al. |
| 7,209,994 B1 | 4/2007 | Klaiber et al. |
| 7,219,181 B2 | 5/2007 | Carty |
| 7,256,992 B1 | 8/2007 | Stewart et al. |
| 7,260,620 B1 | 8/2007 | Halasz |
| 7,260,664 B2 | 8/2007 | Arndt et al. |
| 7,262,962 B1 | 8/2007 | McLeod et al. |
| 7,277,968 B2 | 10/2007 | Brice, Jr. et al. |
| 7,293,204 B2 | 11/2007 | Lu et al. |
| 7,296,120 B2 | 11/2007 | Corrigan et al. |
| 7,302,692 B2 | 11/2007 | Bae et al. |
| 7,313,643 B2 | 12/2007 | Sakurai et al. |
| 7,327,723 B2 | 2/2008 | Kurganov |
| 7,334,107 B2 | 2/2008 | Schoinas et al. |
| 7,340,582 B2 | 3/2008 | Madukkarumukumana et al. |
| 7,370,224 B1 | 5/2008 | Jaswa et al. |
| 7,380,041 B2 | 5/2008 | Belmar et al. |
| 7,398,343 B1 | 7/2008 | Marmash et al. |
| 7,412,488 B2 | 8/2008 | Jha et al. |
| 7,418,572 B2 | 8/2008 | Hepkin |
| 7,420,831 B2 | 9/2008 | Seo et al. |
| 7,444,493 B2 | 10/2008 | Schoinas et al. |
| 7,454,548 B2 | 11/2008 | Belmar et al. |
| 7,457,900 B2 | 11/2008 | Panesar |
| 7,464,174 B1 | 12/2008 | Ngai |
| 7,478,167 B2 | 1/2009 | Ould-Brahim et al. |
| 7,480,303 B1 | 1/2009 | Ngai |
| 7,519,647 B2 | 4/2009 | Carlough et al. |
| 7,525,957 B2 | 4/2009 | Scherer et al. |
| 7,535,828 B2 | 5/2009 | Raszuk et al. |
| 7,546,386 B2 | 6/2009 | Arndt et al. |
| 7,558,348 B1 | 7/2009 | Liu et al. |
| 7,565,463 B2 | 7/2009 | Johnsen et al. |
| 7,594,144 B2 | 9/2009 | Brandyberry et al. |
| 7,613,847 B2 | 11/2009 | Kjos et al. |
| 7,617,340 B2 | 11/2009 | Gregg |
| 7,617,345 B2 | 11/2009 | Clark et al. |
| 7,624,235 B2 | 11/2009 | Wadhawan et al. |
| 7,627,723 B1 | 12/2009 | Buck et al. |
| 7,631,097 B2 | 12/2009 | Moch et al. |
| 7,660,912 B2 | 2/2010 | Gregg |
| 7,676,617 B2 | 3/2010 | Kloeppner |
| 7,729,316 B2 | 6/2010 | Uhlik |
| 7,836,254 B2 | 11/2010 | Gregg et al. |
| 7,873,851 B1 | 1/2011 | Linnell et al. |
| 7,975,076 B2 | 7/2011 | Moriki et al. |
| 8,032,684 B2 | 10/2011 | Pettey et al. |
| 8,041,811 B2 | 10/2011 | Calippe et al. |
| 8,046,627 B2 | 10/2011 | Takubo |
| 8,082,466 B2 | 12/2011 | Tanaka et al. |
| 8,140,917 B2 | 3/2012 | Suetsugu et al. |
| 2002/0112067 A1 | 8/2002 | Chang et al. |

(56) References Cited

U.S. PATENT DOCUMENTS

| | | |
|---|---|---|
| 2002/0124211 A1 | 9/2002 | Gray et al. |
| 2003/0056155 A1 | 3/2003 | Austen et al. |
| 2003/0058618 A1 | 3/2003 | Soetemans et al. |
| 2003/0093604 A1 | 5/2003 | Lee |
| 2003/0097503 A1 | 5/2003 | Huckins |
| 2003/0177221 A1 | 9/2003 | Ould-Brahim et al. |
| 2003/0198180 A1 | 10/2003 | Cambron |
| 2003/0200477 A1 | 10/2003 | Ayres |
| 2004/0024905 A1 | 2/2004 | Liao et al. |
| 2004/0088604 A1 | 5/2004 | Bland et al. |
| 2004/0117534 A1 | 6/2004 | Parry et al. |
| 2004/0130868 A1 | 7/2004 | Schwartz et al. |
| 2004/0133819 A1 | 7/2004 | Krishnamurthy et al. |
| 2004/0136130 A1 | 7/2004 | Wimmer et al. |
| 2004/0199700 A1 | 10/2004 | Clayton |
| 2005/0024187 A1 | 2/2005 | Kranz et al. |
| 2005/0033895 A1 | 2/2005 | Lueck et al. |
| 2005/0071472 A1 | 3/2005 | Arndt et al. |
| 2005/0091438 A1 | 4/2005 | Chatterjee |
| 2005/0116546 A1 | 6/2005 | Zeighami et al. |
| 2005/0144533 A1 | 6/2005 | LeVangia et al. |
| 2005/0146855 A1 | 7/2005 | Brehm et al. |
| 2005/0160214 A1* | 7/2005 | Sauber et al. ................. 710/315 |
| 2005/0162830 A1 | 7/2005 | Wortman et al. |
| 2005/0172037 A1 | 8/2005 | Downing et al. |
| 2005/0182862 A1 | 8/2005 | Ritz et al. |
| 2005/0213513 A1 | 9/2005 | Ngo et al. |
| 2005/0276017 A1 | 12/2005 | Aziz et al. |
| 2005/0286187 A1 | 12/2005 | Liu et al. |
| 2005/0289271 A1 | 12/2005 | Martinez et al. |
| 2005/0289278 A1 | 12/2005 | Tan et al. |
| 2006/0053339 A1 | 3/2006 | Miller et al. |
| 2006/0067069 A1 | 3/2006 | Heard et al. |
| 2006/0085150 A1 | 4/2006 | Gorin |
| 2006/0085573 A1 | 4/2006 | Pike et al. |
| 2006/0087813 A1 | 4/2006 | Becker et al. |
| 2006/0087814 A1 | 4/2006 | Brandon et al. |
| 2006/0095607 A1 | 5/2006 | Lim et al. |
| 2006/0195644 A1 | 8/2006 | Arndt et al. |
| 2006/0206639 A1 | 9/2006 | Tee et al. |
| 2006/0230208 A1 | 10/2006 | Gregg et al. |
| 2006/0236054 A1 | 10/2006 | Kitamura |
| 2006/0253619 A1 | 11/2006 | Torudbakken et al. |
| 2006/0271718 A1 | 11/2006 | DiPlacido, Jr. et al. |
| 2006/0288130 A1 | 12/2006 | Madukkarumukumana et al. |
| 2006/0291447 A1 | 12/2006 | Siliquini et al. |
| 2007/0008663 A1 | 1/2007 | Nakashima et al. |
| 2007/0069585 A1 | 3/2007 | Bosco et al. |
| 2007/0073955 A1 | 3/2007 | Murray et al. |
| 2007/0078996 A1 | 4/2007 | Chen et al. |
| 2007/0115230 A1 | 5/2007 | Tajiri et al. |
| 2007/0127207 A1 | 6/2007 | Katakura et al. |
| 2007/0136554 A1 | 6/2007 | Biran et al. |
| 2007/0168636 A1 | 7/2007 | Hummel et al. |
| 2007/0183393 A1 | 8/2007 | Body et al. |
| 2007/0186074 A1 | 8/2007 | Bradford et al. |
| 2007/0211430 A1 | 9/2007 | Bechtolsheim |
| 2007/0226386 A1 | 9/2007 | Sharp et al. |
| 2007/0226523 A1 | 9/2007 | Chang |
| 2007/0234018 A1 | 10/2007 | Feiste |
| 2007/0239925 A1 | 10/2007 | Koishi |
| 2007/0245041 A1 | 10/2007 | Hua et al. |
| 2007/0262891 A1 | 11/2007 | Woodral et al. |
| 2007/0271559 A1 | 11/2007 | Easton et al. |
| 2007/0273018 A1 | 11/2007 | Onozuka et al. |
| 2007/0274039 A1 | 11/2007 | Hamlin |
| 2008/0043405 A1 | 2/2008 | Lee et al. |
| 2008/0065796 A1 | 3/2008 | Lee et al. |
| 2008/0069141 A1 | 3/2008 | Bonaguro et al. |
| 2008/0077817 A1 | 3/2008 | Brundridge |
| 2008/0091851 A1 | 4/2008 | Sierra |
| 2008/0091868 A1 | 4/2008 | Mizrachi et al. |
| 2008/0091915 A1 | 4/2008 | Moertl et al. |
| 2008/0114906 A1 | 5/2008 | Hummel et al. |
| 2008/0126648 A1 | 5/2008 | Brownlow et al. |
| 2008/0126652 A1 | 5/2008 | Vembu et al. |
| 2008/0147943 A1 | 6/2008 | Freimuth et al. |
| 2008/0148295 A1 | 6/2008 | Freimuth et al. |
| 2008/0162865 A1 | 7/2008 | Koufaty et al. |
| 2008/0168208 A1 | 7/2008 | Gregg |
| 2008/0189577 A1 | 8/2008 | Arndt et al. |
| 2008/0192431 A1 | 8/2008 | Bechtolsheim |
| 2008/0209114 A1 | 8/2008 | Chow et al. |
| 2008/0222406 A1 | 9/2008 | Tabuchi |
| 2008/0235425 A1 | 9/2008 | Belmar et al. |
| 2008/0239687 A1 | 10/2008 | Leigh et al. |
| 2008/0239945 A1 | 10/2008 | Gregg |
| 2008/0244146 A1 | 10/2008 | Das et al. |
| 2008/0259555 A1 | 10/2008 | Bechtolsheim et al. |
| 2008/0263246 A1 | 10/2008 | Larson et al. |
| 2008/0270853 A1 | 10/2008 | Chagoly et al. |
| 2008/0288661 A1 | 11/2008 | Galles |
| 2008/0310181 A1 | 12/2008 | Gurevich et al. |
| 2009/0037682 A1 | 2/2009 | Armstrong et al. |
| 2009/0059520 A1 | 3/2009 | Tanaka et al. |
| 2009/0070760 A1 | 3/2009 | Khatri et al. |
| 2009/0125666 A1 | 5/2009 | Freking et al. |
| 2009/0144462 A1 | 6/2009 | Arndt et al. |
| 2009/0144731 A1 | 6/2009 | Brown et al. |
| 2009/0182966 A1 | 7/2009 | Greiner et al. |
| 2009/0182969 A1 | 7/2009 | Norgaard et al. |
| 2009/0210527 A1 | 8/2009 | Kawato |
| 2009/0210646 A1 | 8/2009 | Bauman et al. |
| 2009/0222814 A1 | 9/2009 | Astrand |
| 2009/0234987 A1 | 9/2009 | Lee et al. |
| 2009/0240849 A1 | 9/2009 | Corneli et al. |
| 2009/0249039 A1 | 10/2009 | Hook et al. |
| 2009/0254692 A1 | 10/2009 | Feehrer |
| 2009/0276551 A1 | 11/2009 | Brown et al. |
| 2009/0276773 A1 | 11/2009 | Brown et al. |
| 2009/0276774 A1 | 11/2009 | Kinoshita |
| 2009/0328035 A1 | 12/2009 | Ganguly |
| 2010/0005234 A1 | 1/2010 | Ganga et al. |
| 2010/0005531 A1 | 1/2010 | Largman et al. |
| 2010/0027559 A1 | 2/2010 | Lin et al. |
| 2010/0042999 A1 | 2/2010 | Dorai et al. |
| 2010/0077117 A1 | 3/2010 | Asnaashari |
| 2010/0115329 A1 | 5/2010 | Tanaka et al. |
| 2010/0131359 A1 | 5/2010 | Ting et al. |
| 2010/0146089 A1 | 6/2010 | Freimuth et al. |
| 2010/0157463 A1 | 6/2010 | Arizono et al. |
| 2010/0169674 A1 | 7/2010 | Kazama |
| 2010/0172078 A1 | 7/2010 | Tanaka et al. |
| 2010/0205608 A1 | 8/2010 | Nemirovsky et al. |
| 2010/0211714 A1 | 8/2010 | LePage |
| 2010/0287209 A1 | 11/2010 | Hauser |
| 2010/0312894 A1 | 12/2010 | Awad et al. |
| 2011/0016235 A1 | 1/2011 | Brinkmann et al. |
| 2011/0029696 A1 | 2/2011 | Uehara |
| 2011/0029734 A1 | 2/2011 | Pope et al. |
| 2011/0131359 A1 | 6/2011 | Pettey et al. |
| 2011/0167189 A1 | 7/2011 | Matsubara et al. |
| 2011/0219161 A1 | 9/2011 | Deshpande et al. |
| 2011/0258352 A1 | 10/2011 | Williams et al. |
| 2011/0265134 A1 | 10/2011 | Jaggi et al. |
| 2011/0317351 A1 | 12/2011 | Pizzolato et al. |
| 2011/0317743 A1 | 12/2011 | DeCusatis et al. |
| 2011/0320602 A1 | 12/2011 | Carlson et al. |
| 2011/0320653 A1 | 12/2011 | Lais et al. |
| 2011/0320666 A1 | 12/2011 | Gregg et al. |
| 2011/0320670 A1 | 12/2011 | Bayer et al. |
| 2011/0320674 A1 | 12/2011 | Gregg et al. |
| 2011/0320675 A1 | 12/2011 | Gregg et al. |
| 2011/0320703 A1 | 12/2011 | Craddock et al. |
| 2011/0320796 A1 | 12/2011 | DeCusatis et al. |
| 2011/0320861 A1 | 12/2011 | Bayer et al. |
| 2011/0320887 A1 | 12/2011 | Craddock et al. |
| 2011/0320892 A1 | 12/2011 | Check et al. |

FOREIGN PATENT DOCUMENTS

| | | |
|---|---|---|
| CN | 101571631 A | 11/2009 |
| CN | 102193239 A | 9/2011 |
| JP | 57191826 | 11/1982 |

(56) References Cited

FOREIGN PATENT DOCUMENTS

| JP | 5981724 | 5/1984 |
|---|---|---|
| JP | 6279557 | 4/1987 |
| JP | 0553973 | 3/1993 |
| JP | 2007087082 A | 4/2007 |
| JP | 2007241526 A | 9/2007 |
| JP | 2010134627 A | 6/2010 |
| WO | 9600940 A1 | 11/1996 |
| WO | 2009027189 A1 | 3/2008 |

OTHER PUBLICATIONS

U.S. Appl. No. 13/675,464; Final Office Action; Date Filed: Nov. 13, 2012; Date Mailed: Feb. 10, 2014; pp. 1-9.
Non Final Office Action for U.S. Appl. No. 12/821,245, mailed Oct. 7, 2013, 23 pages.
Final Office Action dated Jun. 14, 2013 for U.S. Appl. No. 12/821,239, 14 pages.
Informational Materials for IDS, date May 8, 2013, 4 pages.
International Search Report of the Patent Cooperation Treaty for International Application No. PCT/CN2013/070828, mailing date Apr. 25, 2013, 13 pages.
U.S. Appl. No. 13/675,464; Non Final Office Action, Date Filed: Nov. 13, 2012; Date Mailed: Oct. 10, 2013, 39 pages.
Baumann, Andrew, et al., "The Multikernel: A New OS Architecture for Scalable Multicore Systems," Oct. 2009, SOSP'09, Oct. 11-14, 2009, Big Sky, Montana, USA, pp. 29-43.
Crawford et al. "Accelerating Computing with the Cell Broadband Engine Processor"; CF'08, May 5-7, 2008; Ischia, Italy; Copyright 2008 ACM 978-1-60558-077.
Darren Abramson et al.; "Intel Virtualization Technology for Directed I/O"; Intel Technology Journal, vol. 10, Issue 3, Aug. 10, 2006; pp. 1-16.
Dolphin Interconnect Solutions; MySQL Acceleration Solutions; Solid State Storage; Embeded and HPC Solutions; "DXH510 PCI Express Host Adapter"; ww.dolphinics.com/products/pent-dxseries-dsh510.html downloaded Jun. 10, 2010.
Final Office Action mail date Jun. 15, 2011 for U.S. Appl. No. 12/821,221.
Huang, Wei et al., "A Case for High Performance Computing with Virtual Machines," ISC '06, Jun3 28 30, Carins, Queensland, Australia, pp. 125-134, Jun. 3, 2006.
"Intel (registered trademark) Itanium (registered trademark) Architecture Software Developer's Manual," vol. 2, Rev. 2.2, Jan. 2006.
"z/VM: General Information Manual," IBM Publication No. GC24-5991-05, May 2003.
"DMA Engines Bring Mulicast to PCI Express Systems," http://electronicdesign.com, Aug. 13, 2009, 3 pages.
"I/O Virtualization and AMD's IOMMU," AMD Developer Central, http://developer.amd.com/documentation/articles/pages.892006101.aspx, Aug. 9, 2006.
"IBM Enhances the IBM eServer zSeries 990 Family of Servers," Hardware Announcement, Oct. 7, 2003, pp. 1-11.
Internet Article, "Large Page Support in the Lunux Kernel," http://lwn.net./Articles/6969/<retrieved on Jan. 26, 2010>.
International Search Report for PCT/EP2011/059810, Sep. 14, 2011.
J. Regula, "Using Non-transparent Bridging in PCI Express Systems", PLX Technology, Inc., pp. 1-31; Published: Jun. 1, 2004.
Jack Regula "Ethernet Tunneling through PCI Express Inter-Processor Communication, Low Latency Storage IO Source"; www.wwpi.com; Publisher: Computer Technology Review; Jan. 19, 2009.
K. Vaidyanathan et al.; "Exploiting RDMA Operations for Providing Efficient Fine-Grained Resource Monitoring in Cluster-Based Servers"; Jun. 2006; pp. -10; Downloaded: Apr. 13, 2010 at 18:53:46 UTC from IEEE Xplore. 1-4244-0328-6/06.
Non-final office Action received for U.S. Appl. No. 12/821,239 dated Nov. 8, 2012.
Final Office Action dated Aug. 3, 2012 for U.S. Appl. No. 12/821,245.
Non-final Office Action dated Sep. 26, 2012 for U.S. Appl. No. 12/821,243.
Final Office Action dated Sep. 13, 2012 for U.S. Appl. No. 12/821,256.
Final Office Action Received Mar. 2, 2012 for U.S. Appl. No. 12/821,221.
Final Office Action received Oct. 10, 2012 for U.S. Appl. No. 12/821,221.
Non-final Office Action dated Jun. 5, 2012 for U.S. Appl. No. 12/821,221.
Non-final Office Action received Oct. 11, 2012 for U.S. Appl. No. 12/821,247.
Notice of Allowance dated Sep. 19, 2012 for U.S. Appl. No. 12/821,224.
Non-final Office Action dated Jul. 11, 2012 for U.S. Appl. No. 12/821,222.
Final Office Action dated Jul. 19, 2012 for U.S. Appl. No. 12/821,250.
Non-final Office Action received Feb. 16, 2012 for U.S. Appl. No. 12/821,250.
Mysore, Shashidhar et al., "Understanding and Visualizing Full Systems with Data Flow Tomography" SPOLOS '08, Mar. 1-5, 2008, Seattle, Washington, USA, pp. 211-221.
Narayanan Ganapathy et al.; Papers-USENIX Annual Teleconference (No. 98); Entitled: "General Purpose Operating System Support for Multiple Page Sizes" 1998; pp. 1-9.
Non Final Office Action recieved May 8, 2012 for U.S. Appl. No. 12/821,243.
Non Final Office Action received Mar. 15, 2012 for U.S. Appl. No. 12/821,242.
Non Final Office Action received May 4, 2012 for U.S. Appl. No. 12/821,256.
U.S. Appl. No. 12/821,221, Non-Final Office Action mail date Jan. 10, 2011.
Paulsen, Erik; "Local Memory Coaxes Top Speed from SCSI Masters"; Electronic Design, v. 41, (Apr. 15, 1993) p. 75-6+.
PCI Express Base Specification Rev 1.0a, Apr. 15, 2003 p. 1-2, 31, 35-36, 43-44, 49-51, 55, 59-62, 74, 101.
Robert F. Kern, "IBM System z & DS8000 Technology Synergy", IBM ATS Americas Disk Storage; Jul. 21, 2009, pp. 1-25.
Swift, Micael M. et al., "Improving the Reliability of Commodity Operating Systems, " ACM Transactions on Computer Systems, vol. 23, No. 1, Feb. 2005, pp. 77-110.
Szwed et al.; "Managing Connected PCI Express Root Complexes"; Dated: Dec. 23, 2009—6 pages.
Talluri et al., "A New Page Table for 64-bit Address Spaces," ACM SIGOPS Operating Systems Review, vol. 29, Issue 5 (Dec. 1995), pp. 194-200.
VTdHowTo—Xen Wiki; Downloaded—Apr. 16, 2010; pp. 1- 5; http://wiki.xensource.com/xenwiki/VTdHowTo.
Winwood, Simon, et al., "Multiple Page Size Support in the Linux Kernel", Proceedings of Ottawa Linux Symposium, 2002.
Xu, Min et al., "Towards a VMM-based Usage Control Framework for OS Kernel Integrity Protection," SACMAT '07, Jun. 20-22, 2007, Sophia Antipolis, France, pp. 71-80.
z/Architecture Principles of Operation, Feb. 2009; pp. 1-1344.
z/VM: Running Guest Operating Systems, IBM Publication No. SC24-5997-02, Oct. 2001.
U.S. Appl. No. 13/675,464; Notice of Allowance; Date Filed: Nov 13, 2012, Date Mailed: Feb. 20, 2014; pp. 1-5.
U.S. Appl. No. 12/821,239; Final Office Action; Date Filed Jun. 23, 2010; Date Mailed: Jun. 14, 2013; 14 pages.
U.S. Appl. No. 13/674,987; Non-Final Office Action; Date Filed: Nov. 13, 2012; Date Mailed: Mar. 26, 2015; 59 pages.

* cited by examiner

INPUT/OUTPUT (I/O) EXPANSION RESPONSE PROCESSING IN A PERIPHERAL COMPONENT INTERCONNECT EXPRESS (PCIE) ENVIRONMENT

CROSS-REFERENCE TO RELATED APPLICATION

This application is a continuation of and claims priority from U.S. patent application Ser. No. 12/821,239, filed on Jun. 23, 2010, entitled "INPUT/OUTPUT (I/O) EXPANSION RESPONSE PROCESSING IN A PERIPHERAL COMPONENT INTERCONNECT EXPRESS (PCIE) ENVIRONMENT", the entire contents of which are incorporated herein by reference.

BACKGROUND

This invention relates generally to processor input/output (I/O) interfacing within a computing environment, and more particularly to processing I/O expansion responses in a Peripheral Component Interconnect Express (PCIe) environment for transactions that do not natively support responses.

PCIe is a component level interconnect standard that defines a bi-directional communication protocol for transactions between I/O adapters and host systems. PCIe communications are encapsulated in packets according to the PCIe standard for transmission on a PCIe bus. Packets originating at I/O adapters and ending at host systems are referred to as upbound packets. Packets originating at host systems and terminating at I/O adapters are referred to as downbound packets. PCIe transactions include a request packet and, if required, a completion packet (also referred to herein as a "response packet") in the opposite direction. The PCIe topology is based on point-to-point unidirectional links that are paired (e.g., one upbound link, one downbound link) to form the PCIe bus. The PCIe standard is maintained and published by the Peripheral Component Interconnect Special Interest Group (PCI-SIG).

One drawback to the use of PCIe is that all I/O adapters connected to a PCIe bus are required to operate within the parameters defined in the PCIe standard (i.e., they are PCIe compatible I/O adapters). The PCIe standard sets rigid constraints on requests and, completions and on packet packaging and addressing. In some system architectures, for example the IBM® System z® architecture, there is a need to be able to support communications over a PCIe bus between I/O adapters and host systems using transactions that are not supported by the PCIe standard. An example is the ability to communicate with non-PCIe compatible adapters (e.g., I/O expansion adapters), which are typically supporting legacy systems and applications that may be difficult (due, for example to technology issues and/or expense) to convert into the PCIe standard. Thus, while PCIe is suitable for its intended purpose of communicating with PCIe compatible adapters, there remains a need for expanding this capability to allow PCIe to communicate with non-PCIe compatible adapters to support legacy systems.

BRIEF SUMMARY

A method for implementing non-standard I/O adapters in a standardized I/O architecture, the method comprising receiving, at an I/O adapter, a request from a requester to perform an operation on one of the I/O adapters. The method further comprising determining that the request is in a format other than a format supported by an I/O bus, determining that the requester requires a completion response for the request. The method additionally comprising transforming the request into the format supported by the I/O bus, transmitting the request to the I/O adapter, receiving the completion response from the I/O adapter, the completion response comprising an indicator that the request has been completed, the completion response in the format supported by the I/O bus, and transmitting the completion response to the requester.

A method for implementing non-standard I/O adapters in a standardized I/O architecture, the method comprising receiving, at an I/O adapter, a request for an operation, the request indicating that a completion response to the request is required, the completion response comprising an address of the I/O adapter and a response code determining that the operation does not generate the completion response generating a new request, the new request in a format supported by an I/O bus. The method further comprising transforming the header of the new request to include the address of the I/O adapter, and sending the new request to the host system via the I/O bus.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

An exemplary embodiment of the present invention provides for processing of I/O expansion responses for requests that do not support responses in a PCIe architecture, without requiring modification of the PCIe bus and PCIe switch infrastructure.

Figure 1:
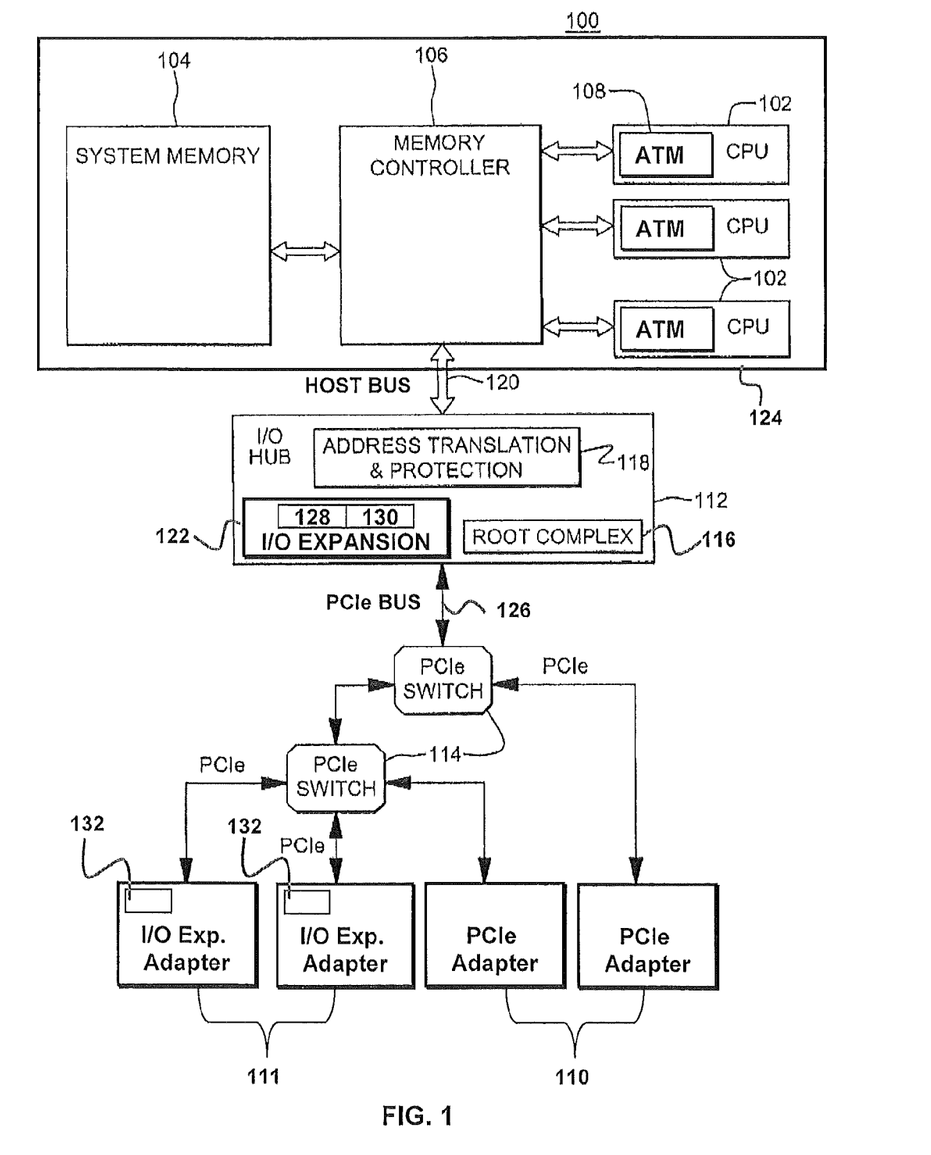
FIG. 1 depicts a block diagram of a computer system that may be implemented in an exemplary embodiment.

FIG. 1 depicts a computer system 100 that may be implemented by an exemplary embodiment of the present invention. In an embodiment, the computer system 100 is a System z® server offered by International Business Machines Corporation (IBM®). System z is based on the z/Architecture® offered by IBM. Details regarding the z/Architecture are described in an IBM publication entitled, "z/Architecture Principles of Operation," IBM Publication No. SA22-7832-07, February 2009, which is hereby incorporated herein by reference in its entirety.

In an exemplary embodiment, computer system 100 includes one or more central processing units (CPUs) 102 coupled to a system memory 104 via a memory controller 106. System memory 104 is accessed when a CPU 102, PCIe adapter 110, or I/O expansion adapter 111 issues a memory request (read or write) that includes an address used to access the system memory 104. The address included in the memory request is typically not directly usable to access system memory 104, and therefore, it requires translation to an address that is directly usable in accessing system memory 104. In an embodiment, the address is translated via an address translation mechanism (ATM) 108. In an embodiment, the ATM 108 translates the address from a virtual address to a real or absolute address using, for example, dynamic address translation (DAT).

The memory request, including the translated address, is received by the memory controller 106. In an embodiment, the memory controller 106 maintains consistency in the system memory 104 and arbitrates between requests for access to the system memory 104 from hardware and software components including, but not limited to, the CPUs 102, the PCIe adapters 110, and the I/O expansion adapters 111 known collectively as I/O adapters.

In an exemplary embodiment, the PCIe adapters 110 perform one or more PCIe I/O functions; and the I/O expansion adapters 111 are not PCIe compatible and perform one or more non-PCIe I/O functions. A memory request that is sent from one of the CPUs 102 to the PCIe adapters 110 or the I/O expansion adapters 111 (i.e., a downbound memory request) is first routed to an I/O hub 112 (e.g., a PCIe hub), which is connected to a PCIe bus 126 (also described herein as an I/O bus). The memory request is then sent from the PCIe bus 126 to one of the PCIe adapters 110 or to one of the I/O expansion adapters 111 via one or more PCIe switches 114. The PCIe bus 126 and PCIe switches 114 communicate in a standard PCIe format as is known in the art.

In an exemplary embodiment, the I/O hub 112 includes one or more state machines, and I/O expansion logic 122 for interpreting and transmitting I/O expansion operations, bi-directionally, between the host system 124 and the I/O expansion adapters 111. The host system 124 transmits requests to the I/O expansion adapters 111 in a format supported by the I/O expansion adapters 111 but incompatible (i.e. not supported) by the PCIe bus 126 and the PCIe switches 114. The I/O expansion logic 122 receives requests and responses from the host system 124 via the host bus 120 and transforms them into a format supported by the PCIe bus 126. As depicted in FIG. 1, the I/O expansion logic 122 includes both downbound expansion logic 128 and upbound expansion logic 130 which are shown as separate logic blocks, however portions or all of the logic within these blocks may overlap. The I/O hub 112 depicted in FIG. 1 also includes a root complex 116 that receives request and completions from one of the PCIe switches 114. Memory requests include an I/O address that may need to be translated, and thus, the I/O Hub 112 provides the address to an address translation and protection unit (ATP unit) 118. The ATP unit 118 is used to translate, if needed, the I/O address into to an address directly usable to access system memory 104.

An upbound memory request initiated from one of the PCIe adapters 110 or I/O expansion adapters 111, including the address (translated or initial address, if translation is not needed), is provided to the memory controller 106 via, for instance, the host bus 120. The memory controller 106 performs arbitration and forwards the memory request with the address to the system memory 104 at the appropriate time to the system memory 104.

In an exemplary embodiment, a memory request is initiated by one of the PCIe adapters 110, by one of the I/O expansion adapters 111, or by the host system 124. In an exemplary embodiment, there are two types of memory requests, posted requests and non-posted requests. Non-posted requests (e.g. memory reads) return a response called a completion that contains the requested data and information related to the status of the result of processing the associated memory request as will be described in more detail below. Posted transactions (e.g. memory writes) are similar to non-posted transactions except that the data is the payload and posted transactions do not return a completion packet. Therefore, any error that occurs during the posted transaction will be unknown to the requester. Both posted and non-posted requests flow through the PCIe infrastructure based on address information contained in their headers as will be described in more detail below.

While PCI defines only Memory Read and Posted Memory Write requests from the PCIe adapters 110 to the root complex 116, System z uses several higher function requests not defined by the PCI specification. All of these requests are various types of atomic requests used for locking protocols and bit manipulation.

One request is called Test and Set. This request operates like a memory read and includes a lock byte and a memory address. If the first byte of the target address (8 byte aligned) is zero, the lock byte is written into this first byte. The target data, up to 256 bytes in this implementation, is returned to the requester. A second request is called Test and Store. This request operates like a Memory Write with a payload of up to 256 bytes in this implementation. It differs from a Memory Write in that the first byte of the payload is used as a lock byte. If the first byte in the target address is zero, the payload is written into the target address. If the first byte in the target address is not zero, the payload is not written into the target address, and a response is generated indicating that the first target byte was not zero.

Three other requests manipulate bits in memory and one also causes an interruption. All three operate like Memory Write requests, and all three include a mask to indicate which target bits should be set or reset. In this implementation, the mask is 8 bytes. The Set Bit Request sets bits indicated by the mask at the target in memory. The Reset Bit Request resets bits indicated by the mask at the target memory. The Set Bit with Interrupt Request first sets bits indicated by the mask at the target in memory and then causes an interruption to the host processor.

Figure 2A:
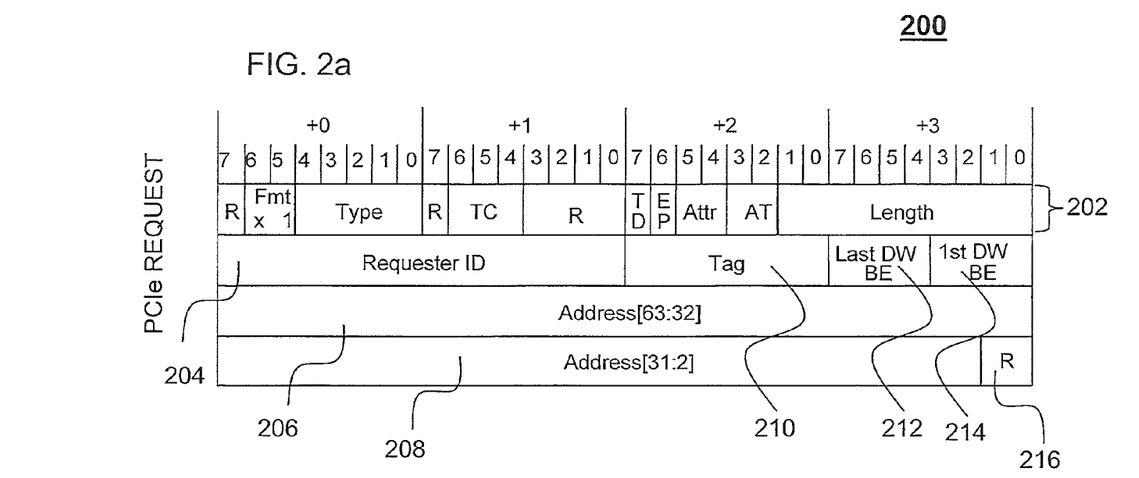
FIG. 2a depicts a block diagram of a standard PCIe request header.

Turning now to FIGS. 2a and 2b, a standard PCIe request and completion header will be described. A typical PCIe memory request includes a header, and if the request is a write, it also includes payload data. A typical PCIe memory completion for a read request includes a header and payload data. The standard PCIe request header 200 comprises a plurality of fields. As shown in the embodiment in FIG. 2a, the first 4 bytes 202 of the standard 64 bit address PCIe request header 200 includes 8 reserved bits indicated by "R," a format field describing the address length (32 or 64 bits) and whether the packet is a request or completion, a traffic class field ("TC"), a transaction layer packet digest ("TD"), a poison bit ("EP"), attributes ("Attr"), address type (AT), length in 4 byte increments, a requester ID 204 and a tag field 210 which together comprise the transaction ID, and last and first doubleword byte enables (Last DW BE and 1st DW BE). The requester ID field 204 includes information used by the routing mechanisms of the computer system 100 to identify the source of the request and to route a response, if provided, to the requester. The address field (206 and 208) comprises a set of high order bits 206 and a set of low order bits 208. Taken together the address field (206 and 208) indicates either the address of the PCIe adapter 110 or I/O expansion adapter 111 to which the request is directed for a downbound transaction, or the system memory address of the system memory 104 for an upbound transaction.

Figure 2B:
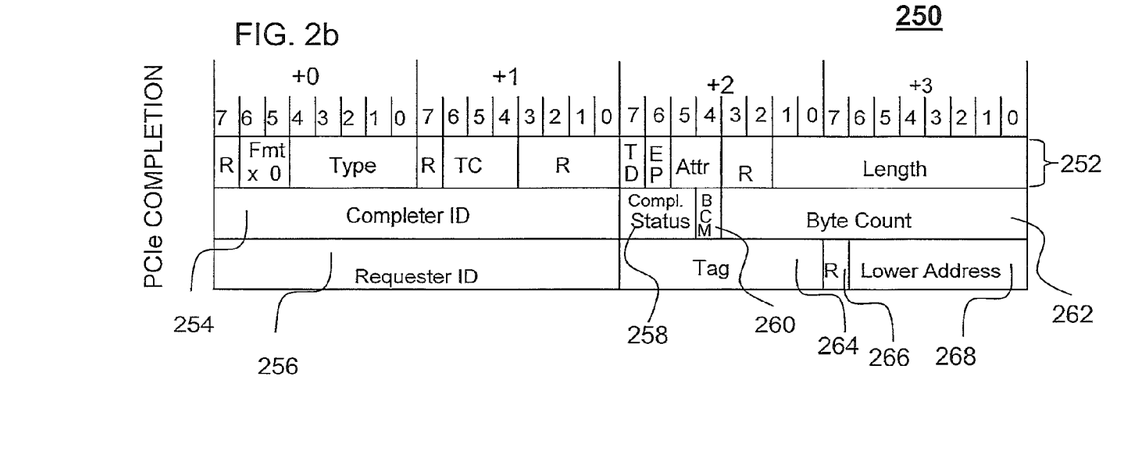
FIG. 2b depicts a block diagram of a standard PCIe completion header.

The completion packet generally comprises a header and payload (not shown) segment. FIG. 2b depicts a standard PCIe completion header 250. The first 4 bytes 252 of the PCIe completion header 250 includes 9 reserved bits indicated by "R," a Format field describing the address length (32 or 64 bits) and whether the packet is a request or completion, a traffic class field ("TC"), a transaction layer packet digest ("TD"), a poison bit ("EP"), attributes (Attr), length in 4 byte increments, a completer ID 254, completion status 258, byte count modified 260 ("BCM"), a byte count 262, a requester ID 256 and tag field 264 which comprises the transaction ID of the request, and the low order address 268 indicating the starting point of the payload data. The completer ID field 254 is the identification of the PCIe adapter 110 or I/O expansion adapter 111 or host that performed the completion. The requester ID 256 and Tag 264 of the PCIe completion header 250 contains the requester ID 204 and Tag 210 of the PCIe request header 200 to match memory completions to their corresponding memory requests. The requester ID 256 is used to route the completion information back to the originator of the memory request. The PCIe completion header 250 also includes a completion status field 258 for indicating if the request was completed successfully or if an error occurred while the adapter (PCIe adapter 110 or I/O expansion adapter 111) or host was processing the request.

Figure 3:
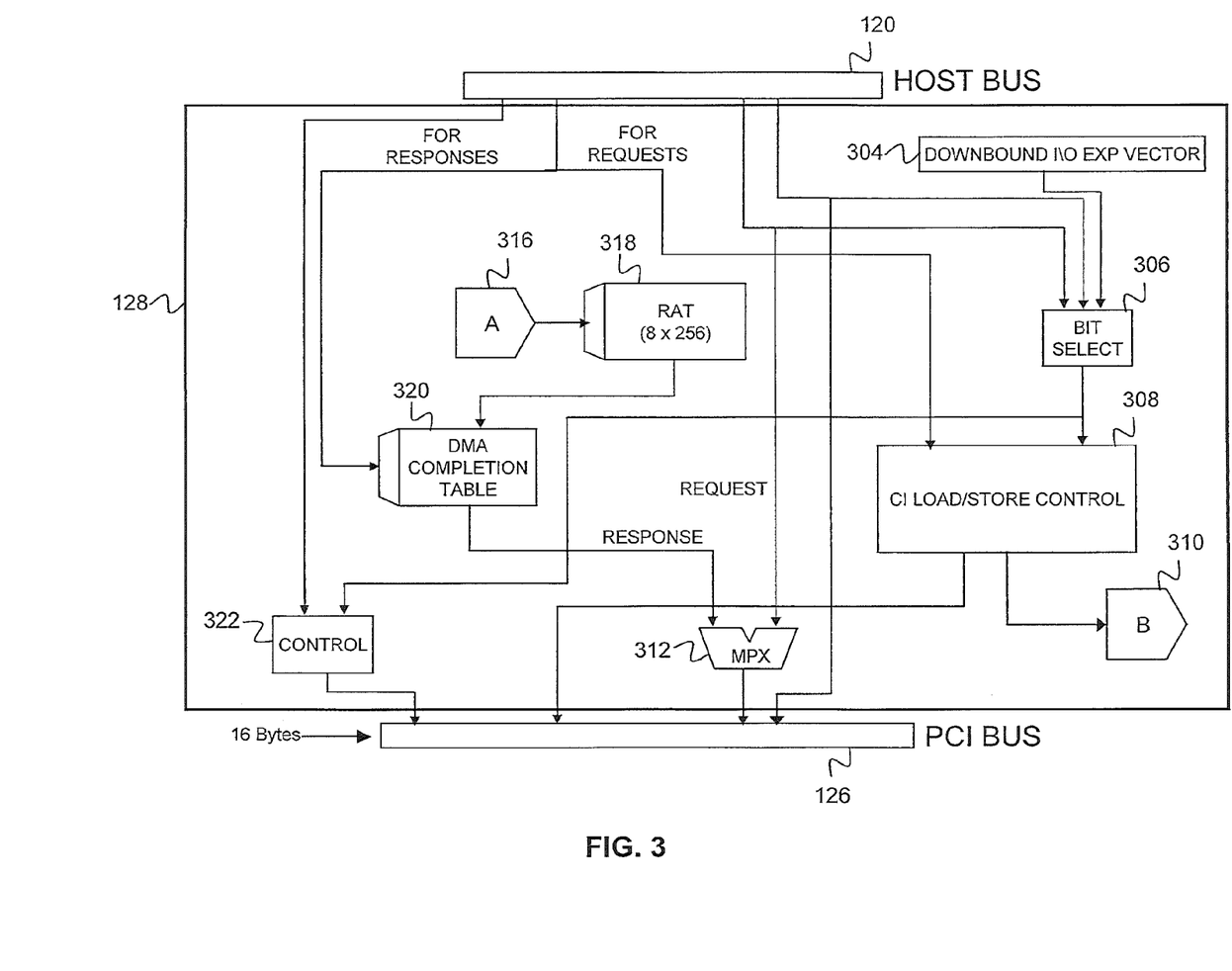
FIG. 3 depicts a block diagram of an exemplary embodiment of I/O expansion logic for downbound request and completion processing.

Turning now to FIG. 3, an exemplary embodiment of the downbound expansion logic 128 (part of I/O expansion logic 122) depicted in FIG. 1 for interpreting and transmitting I/O expansion operations from the host bus 120 to the PCIe bus 126 will be described. I/O expansion operations include a plurality of memory requests (also referred to herein as "downbound requests") and a plurality of responses (also referred to herein as "downbound responses"). The host bus 120 connects the host system 124 to the I/O hub 112 of FIG. 1 and provides transport services for directing requests and responses from the host system 124 to the PCIe adapters 110 and the I/O expansion adapters 111. The I/O expansion adapters 111 operate in a communication format which is incompatible (i.e. not supported) with the PCIe standard format used by the PCIe bus 126, therefore, transformation logic 132 executes within the I/O expansion adapters 111 to enable communication to the PCIe bus 126. The transformation logic 132 transforms (i.e. reformats) requests and responses in the I/O expansion adapter 111 to a format that can be interpreted by the PCIe bus 126. In an exemplary embodiment, the transformation logic 132 executes in logic circuits on the I/O expansion adapter 111. In an alternate embodiment, the transformation logic 132 executes on one or more specialized hardware circuits communicatively coupled to the I/O expansion adapters 111 and the PCIe bus 126. In an additional alternate embodiment, the transformation logic 132 executes as software in the I/O expansion adapter 111. Although downbound requests and downbound responses are operations that are both initiated by the host system 124, different process flows in the downbound expansion logic 128 are used to process each of the operations.

In an exemplary embodiment, a downbound request is placed onto the host bus 120. After a downbound request is placed on the host bus 120, the I/O hub 112 of FIG. 1 collects the downbound request and passes it to the downbound expansion logic 128. The downbound expansion logic 128 provides routing and transformation services based on information contained in the memory request. A downbound I/O expansion vector 304 is used to determine if the downbound request is being sent to one of the I/O expansion adapters 111 of FIG. 1. The downbound I/O expansion vector 304 retrieves information from a header of the downbound request, and using bit select logic 306 determines the destination of the downbound request. A cache inhibited (CI) load/store control 308 stores information related to downbound requests, such as a portion of the host address indicating the target I/O expansion adapter 111 and an operation code, if the host system 124 has indicated a response is required.

In an exemplary embodiment, a downbound request that is bound for one of the I/O expansion adapters 111 of FIG. 1 is transformed into a PCIe compatible downbound request by a multiplexor 312. In an additional embodiment, the CI load/store control 308 sets the opcode in the header of the memory request that is sent from the I/O hub 112 to the PCIe bus 126, this data is used to process an upbound response at block 310 as will be described in more detail in reference to FIG. 4.

In an exemplary embodiment, a downbound response is initiated from the host system 124 in response to completing a request from one of the I/O expansion adapters 111. The downbound response is placed on the host bus 120 and is collected by the I/O hub 112 and passed to the downbound expansion logic 128. A DMA completion table 320, as depicted in FIG. 3, contains records for all requests that are awaiting responses. In an exemplary embodiment the records in the DMA completion table 320 are updated to include information required to forward the downbound response from the host system 124 to the I/O expansion adapter 111. A response address table (RAT) 318 is used to lookup downbound response routing information. The address information is stored for requests sent from the I/O expansion adapters 111 to the host bus 120 (also referred to herein as "upbound requests") as they are processed, as will be described in more detail below. The upbound processing logic transmits the address data to the RAT 318 at the appropriate processing step at block 316 as will be described in more detail below in reference to FIG. 4. Control logic 322 adds an operation code (also referred to herein as "opcode") to the downbound response which is used by the I/O expansion adapters 111 to process the downbound response. In an exemplary embodiment the downbound expansion logic 128 is implemented in hardware circuits in the I/O hub, however, it will be understood that in alternate embodiments the downbound expansion logic may be executed as software in the hub or as a combination of hardware and software executing on the hub or other logic circuits as is known in the art.

Figure 4:
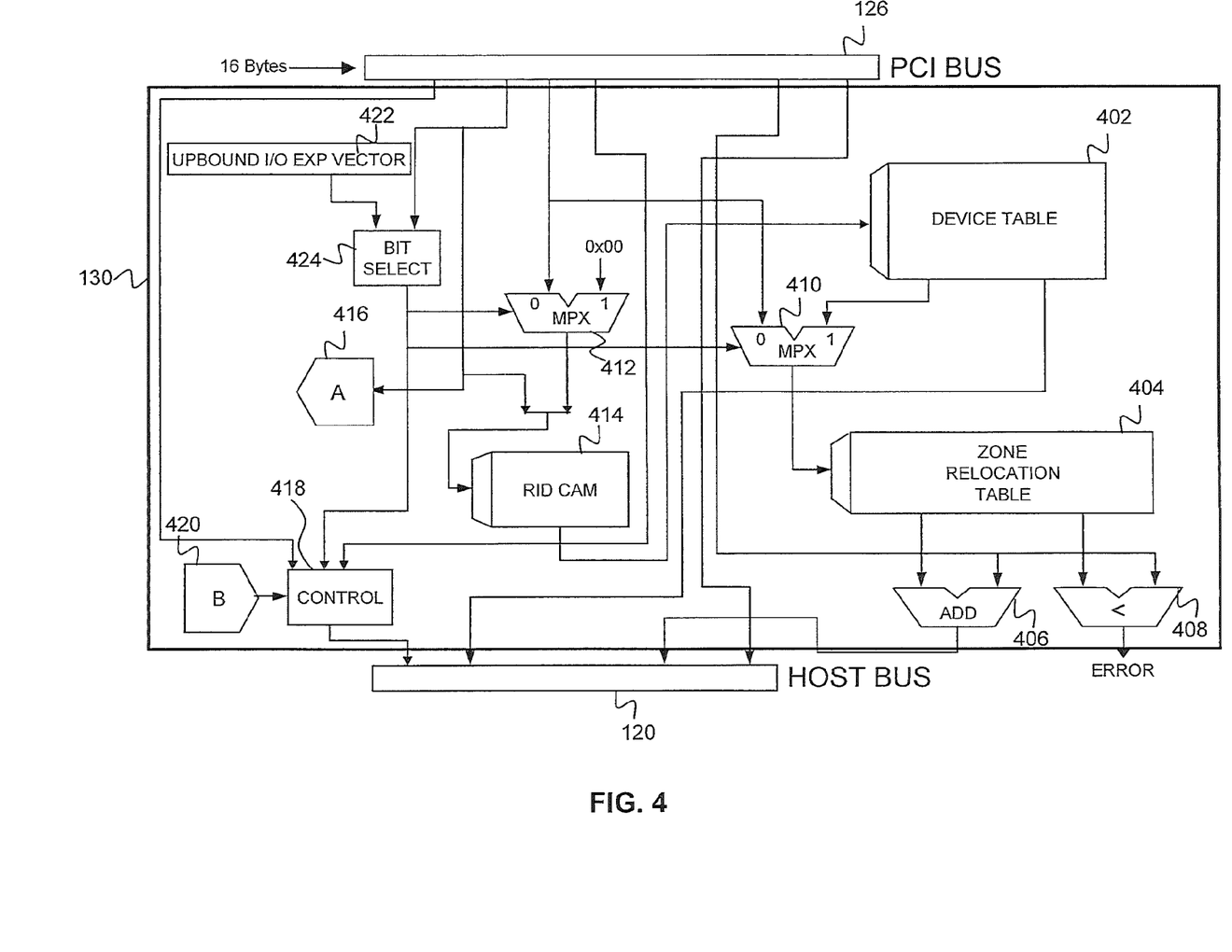
FIG. 4 depicts a block diagram of an exemplary embodiment of I/O expansion logic for upbound request and completion processing.

Turning now to FIG. 4, an exemplary embodiment of the upbound expansion logic 130 (part of I/O expansion logic 122) depicted in FIG. 1 for interpreting and transmitting I/O expansion operations from the PCIe bus 126 to the host bus 120 will be described. These I/O expansion operations include a plurality of requests (also referred to herein as "upbound requests") and a plurality of responses (also referred to herein as "upbound completions"). Both upbound requests and upbound completions are initiated by one or more of the I/O expansion adapters 111. An upbound I/O expansion vector 422 is used to determine if the upbound request is being sent from one of the I/O expansion adapters 111. The upbound I/O expansion vector 422 retrieves information from a header of the upbound request, and using the bit select logic 424 determines the source of the upbound request. Once the source of the upbound request is determined, the address routing information is stored in the RAT 318 of FIG. 3, by transporting the data to the RAT 318 at block 416. A multiplexor 412 is used to extract the requester ID 204 from the PCIe request header 200 of FIG. 2*a* from the upbound request. The requester ID 204 bus number is passed to the RAT 318. The requester ID 204 including the bus number, device number, and function number is passed from the multiplexor 412 to a requester ID content addressable memory (RID CAM) 414. The RID CAM 414 provides an index into the device table 402. The device table 402 is used to determine the virtual address of a particular function within the I/O expansion adapter 111 of FIG. 1 based on the requester ID 204. The data extracted from the device table 402 is modified by a multiplexor 410, and the output of the multiplexor 410 is used by a zone relocation table 404 to determine the correct address and partition of the host system 124 for which the request is to be sent. The operation code of the packet is processed by control logic 418 and is transformed into the appropriate I/O expansion operation code before being transmitted to the host bus 120.

In an exemplary embodiment, the upbound completions are processed as described above, however, the control logic 418 matches the upbound completion with a downbound request using data transmitted to it from the CI load/store control 308 at block 420 when the downbound request was processed as described above.

Figure 5:
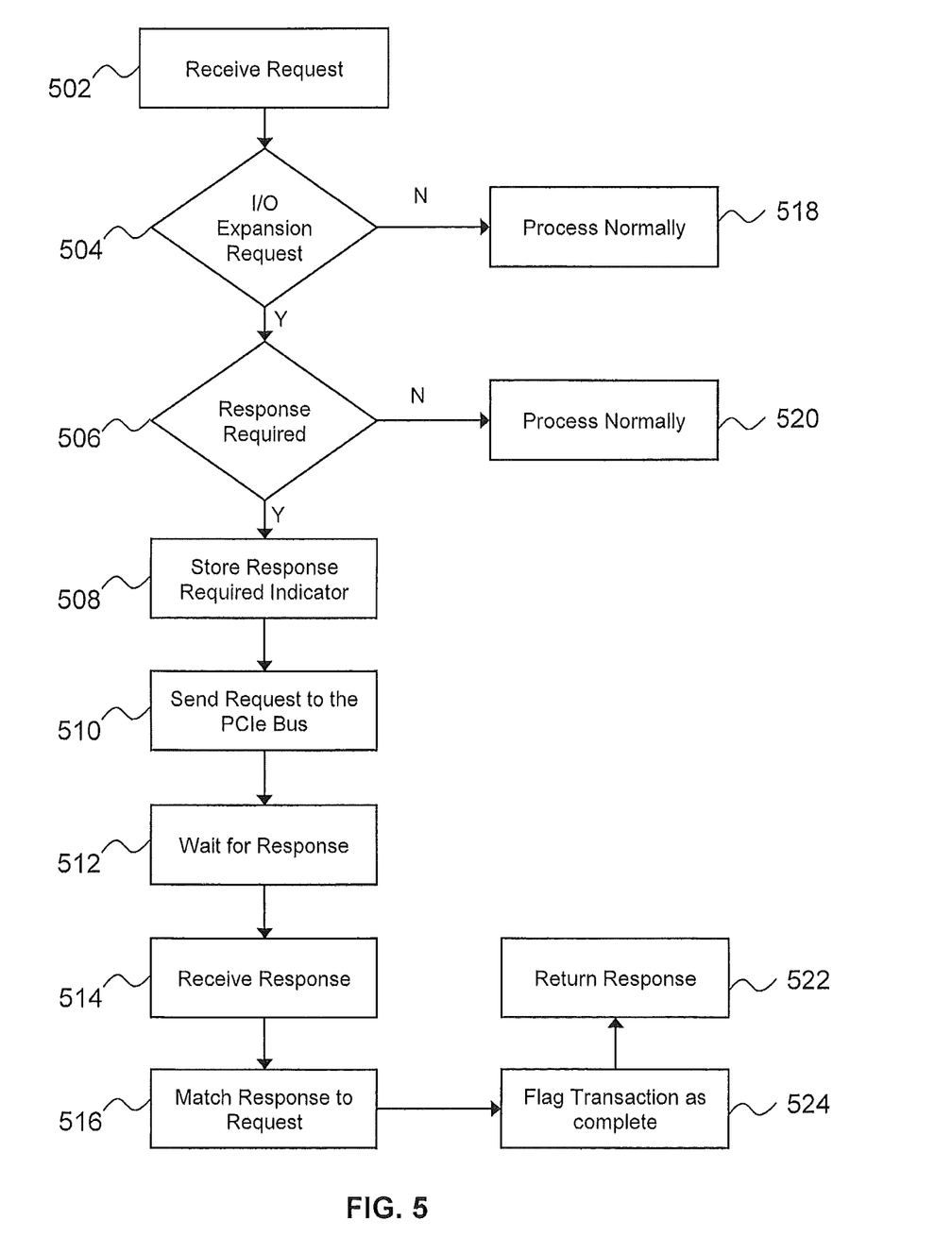
FIG. 5 depicts a process flow of an exemplary embodiment of I/O expansion logic for processing a request/response pair.

Turning now to FIG. 5, a detailed block diagram of an exemplary embodiment of an I/O expansion response and request match processing flow will now be described. In an exemplary embodiment, the I/O expansion response and request match processing flow executes in the I/O expansion logic 122 of the I/O hub 112 of FIG. 1 and matches a downbound request with an upbound response (or upbound completion). At block 502, the I/O hub 112 receives a request from the host system 124. At block 504 the I/O hub 112 determines if the received request is an I/O expansion request. The I/O hub 112 uses bits in the address field of the host system 124 request received on the host bus 120 to index into the downbound I/O expansion vector 304 to determine if the request is an I/O expansion request. As used herein the term "I/O expansion request" refers to a request from the host system 124 to access a peripheral device attached to an I/O expansion adapter 111. If the I/O hub 112 determines that the request is not an I/O expansion request (if it is a PCIe request that can be serviced by a PCIe adapter 110, for example), the I/O hub 112 transmits the request over the PCIe bus 126 at block 518 to, for example, a PCIe adapter 110. If the I/O hub 112 determines that the request is an I/O expansion request at block 504, then at block 506, the I/O hub 112 determines if a response is required by the host system 124 by examining another address bit in the address field of the host system 124 request received on the host bus 120. If the I/O hub 112 determines that a response is not required, the I/O hub 112 transmits the request over the PCIe bus 126 at block 520. If the I/O hub 112 determines that a response is required at block 506, then at block 508 a response required indicator is stored at the I/O hub 112 in the CI load/store control 308 along with information about the request including an opcode of the operation to be performed according to the request, a portion of the address from the host system 124 request received on the host bus 120 to identify the destination I/O expansion adapter 111, and a tag sent on the PCIe bus 126. At block 510, the I/O hub 112 sends the request to the I/O expansion adapter 111 via the PCIe bus 126. At block 512, the I/O hub 112 continues to process additional requests and responses while waiting to match a response to the original request to the data stored at block 508. At block 514, a matching response is return by the I/O expansion adapter 111 and received by the I/O hub 112. At block 516 the response is matched to the request record stored at block 508 and at block 524 the transaction is flagged as complete in the I/O hub 112. The response is matched to the request by examining the response's RID bus number in the PCIe posted write request header and the tag value embedded into the PCIe header address. Logic in both the CI load/store control 308 and control logic 418 are used to provide this matching. At block 522, the response is returned to the host system 124.

In an additional embodiment, at block 506 the I/O hub 112 determines that the host system 124 requires only an acknowledgement of receipt of the request, and the I/O hub 112 returns a response to the host system 124 indicating that the request has been received.

Figure 6:
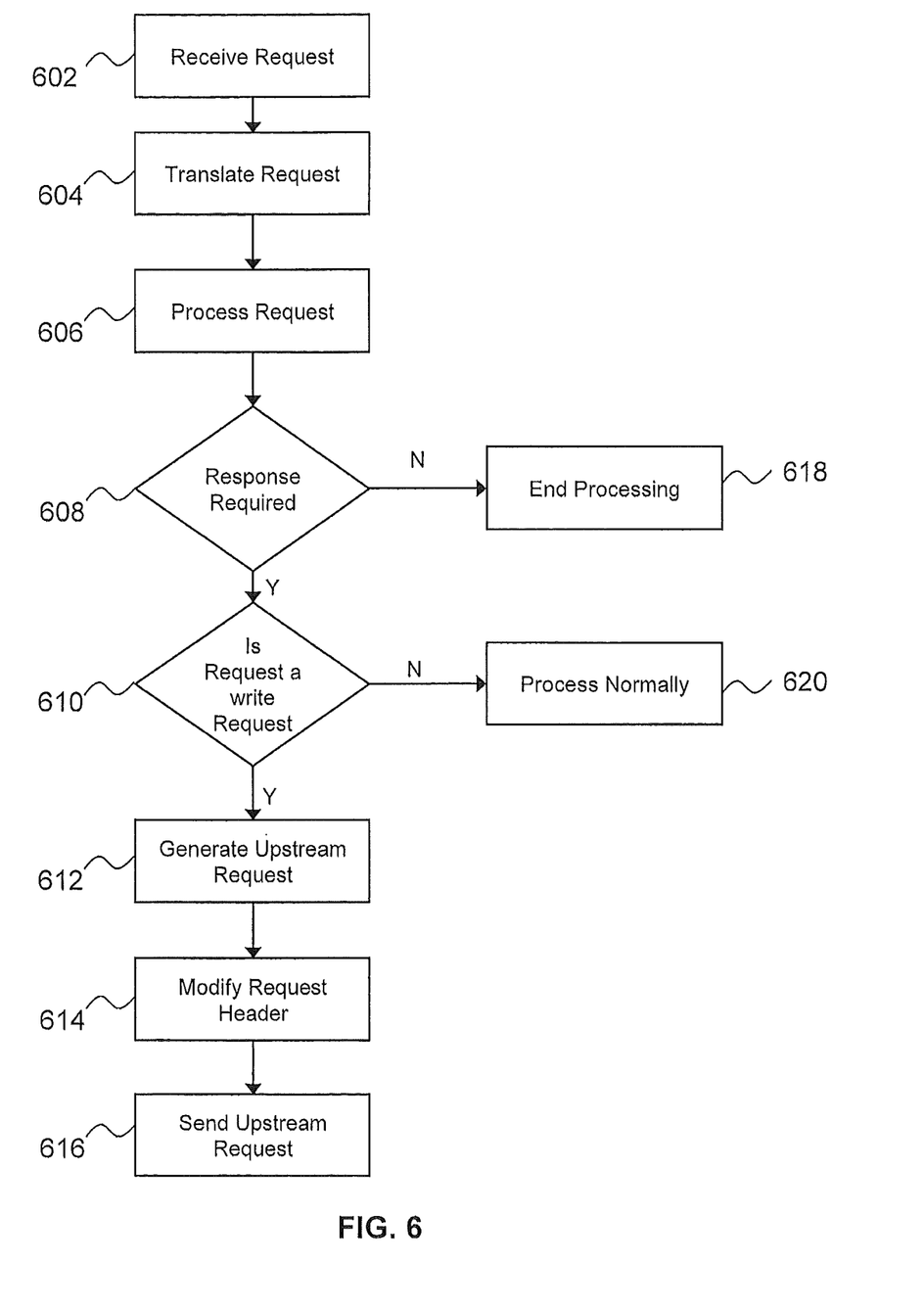
FIG. 6 depicts a process flow of an exemplary embodiment of I/O expansion logic for processing a response from an I/O expansion adapter.

Turning now to FIG. 6, a detailed block diagram of an exemplary embodiment of an upbound I/O expansion response processing flow will now be described. In an exemplary embodiment, the upbound I/O expansion response processing flow executes in the I/O expansion logic 122 of the I/O hub 112 and the transformation logic 132 of the I/O expansion adapters 111 of FIG. 1 and transforms an upbound response into the format of the PCIe request header 200 of FIG. 2*a* for I/O expansion transactions that require a response but for which a PCIe response is not supported (i.e. write requests). At block 602, the I/O expansion adapter 111 of FIG. 1 receives a request from the host system 124. At block 604 the transformation logic 132 of the I/O expansion adapter 111 transforms the request into a format supported by the I/O expansion adapter 111. At block 606, the I/O expansion adapter 111 processes the request. At block 608, the I/O expansion adapter 111 checks an indicator in the request to determine if a response is required. If a response is not required, processing ends at block 618. If a response is required the I/O expansion adapter 111 checks if the request is a write request at block 610. If the request is a not a write request (i.e. a read request) then the response is returned via the standard PCIe completion response at block 620. At block 612, if the request is determined to be a write request, the transformation logic 132 of the I/O expansion adapter 111 of FIG. 1 generates a new standard PCIe request including a PCIe request header 200 of FIG. 2*a*.

Figure 7:
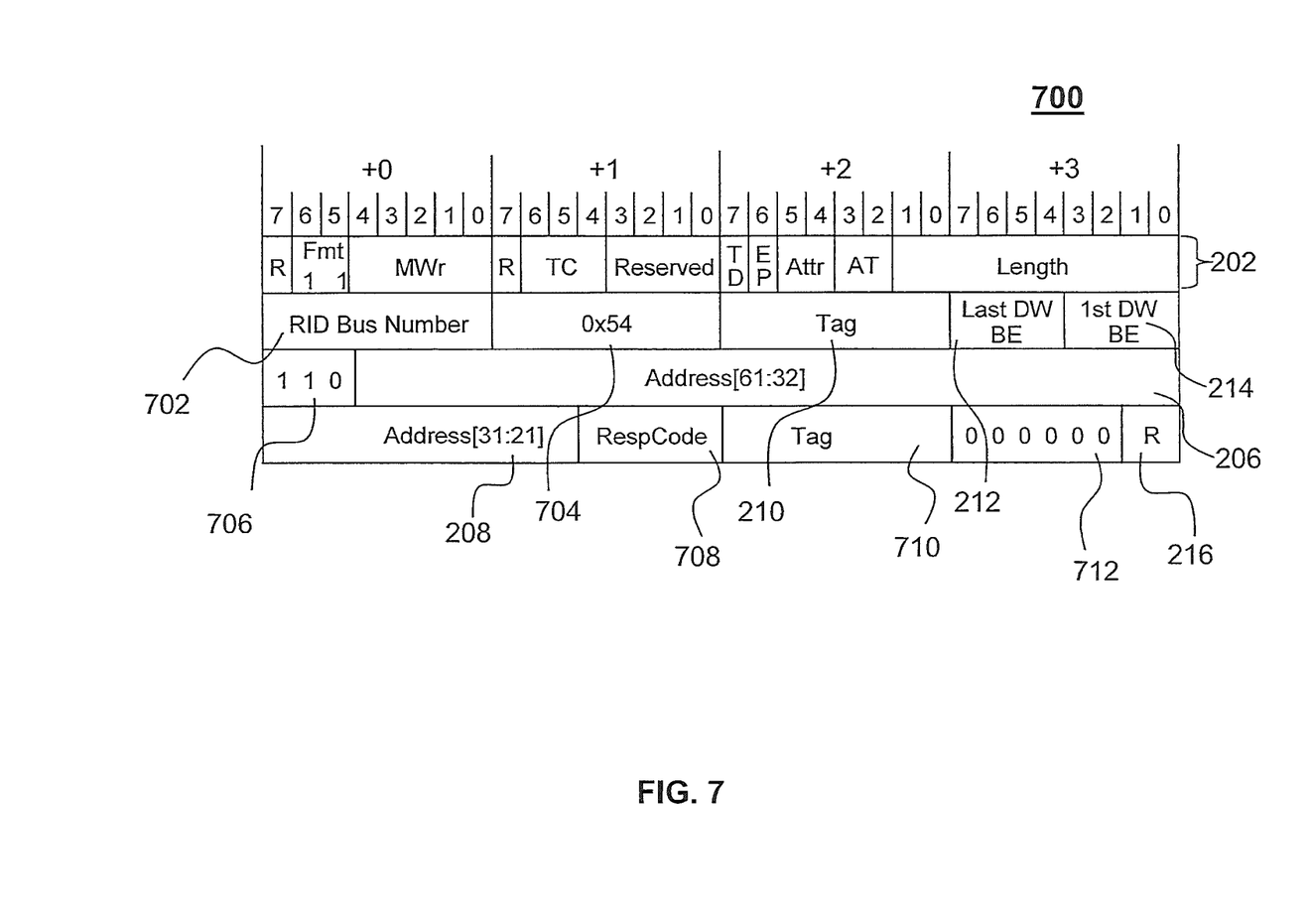
FIG. 7 depicts a block diagram of an exemplary embodiment transformed PCIe request header containing an I/O expansion response.

At block 614, I/O expansion information from the response is embedded in a transformed PCIe request header, such as the transformed PCI request header 700 depicted in FIG. 7. The first 4 bytes of the PCIe request header 200 of FIG. 2*a* remain unchanged and function in the same way as described above with regard to FIG. 2*a*. As shown in FIG. 7, the requester ID field 204 of FIG. 2*a* is replaced with two new fields, a request ID bus number field 702 and an operation code field 704. The request ID bus number field 702 is the PCI bus number of the responding I/O expansion adapter 111. The operation code field 704, is used to indicate the type of request that was completed by the I/O expansion adapter 111 and is used by one of the I/O hub 112 to indicate the type of response. The first three bits of the high order bits of the address field 206 of FIG. 2*a*, are replaced with an indicator 706 to uniquely identify this posted memory request packet as a response to a downbound posted memory request to one of the I/O expansion adapters 111. The first bit (most significant) is always a 1 for all upbound packets. The address routing in the switches is configured to route all packets with the highest order address bit set to 1 towards the root complex 116 of FIG. 1. The next few bits differentiate the packet as either a DMA write or a special command such as a response, Atomic, Test and Set, Test and Store, etc. The low order bits of the address field 208 of FIG. 2a are modified to include a response code field 708 for indicating the status of the completed request. Responses include good status and several bad status codes such as invalid address and general error, and a tag field 710 from the request for matching the response with the request. The rest of the bits are unused and are usually set to zero. The lowest order six address bit are set to zero to keep any payload on a 256 byte boundary. The reserved bits 216 of FIG. 2a remains unchanged. Although specific modifications have been described, it will be understood that other fields or values in the request header could be modified or added in alternate embodiments while still preserving the functions described above.

Returning now to block 616 of FIG. 6, once the PCIe request header has been formatted and the I/O expansion response information embedded into a PCI formatted request, the request, including the transformed PCIe request header 700, is sent to the host system 124 via the I/O hub 112.

Technical effects and benefits include enabling the use of non-PCIe compatible I/O adapters to be implemented on a PCIe architecture along with PCIe compatible adapters without requiring modifications to the PCIe bus and PCIe switch mechanisms.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In exemplary embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for implementing non-standard input/output (I/O) adapters in a standardized I/O architecture, the method comprising:
   receiving, at an I/O hub, a request from a requester to perform an operation on one of the I/O adapters;
   determining that the request is in a format other than a format supported by an I/O bus;
   determining that the requester requires a completion response for the request;
   determining whether the operation generates the completion response;
   based on determining that the operation generates the completion response:
      transforming the request into the format supported by the I/O bus;
      transmitting the request to the I/O adapter;
      receiving the completion response from the I/O adapter, the completion response comprising an indicator that the request has been completed, the completion response in the format supported by the I/O bus; and
      transmitting the completion response to the requester; and
   based on determining that the operation does not generate the completion response:
      generating a new request, the new request in a format supported by an I/O bus;
      transforming the header of the new request to include the address of the I/O adapter; and
      sending the new request to the host system via the I/O bus,
      wherein the completion response is in a format not supported by the I/O bus and the new request is in a format not supported by the I/O adapter and a requester, the requester initiating the request.

2. The method of claim 1, wherein the I/O bus is a PCIe bus.

3. The method of claim 1, wherein the format of the request an I/O expansion format.

4. The method of claim 1, wherein the I/O adapter comprises at least one I/O expansion adapter and at least one PCIe adapter.

5. The method of claim 1, wherein the transformed request is in a format not supported by the I/O adapter and the requester.

6. The method of claim 1, further comprising:
   determining that the request is a request to store data; and
   storing information about the requester in the I/O hub in response to the determining, the information comprising:
      the requester address;
      the operation code, the operation code identifying the operation that is to be performed; and
      an indicator indicating that a response is required.

7. A method for implementing non-standard input/output (I/O) adapters in a standardized I/O architecture, the method comprising:
   receiving, at an I/O adapter, a request for an operation, the request indicating that a completion response to the request is required, the completion response comprising an address of the I/O adapter and a response code;
   determining that the operation does not generate the completion response;
   generating a new request, the new request in a format supported by an I/O bus;
   transforming the header of the new request to include the address of the I/O adapter; and
   sending the new request to the host system via the I/O bus,
wherein the completion response is in a format not supported by the I/O bus and the new request is in a format not supported by the I/O adapter and a requester, the requester initiating the request.

8. The method of claim 7, wherein the I/O bus is a PCIe bus.

9. The method of claim 7, wherein the format of the completion response is an I/O expansion format.

10. The method of claim 7, wherein the I/O adapter comprises an I/O expansion adapter, the I/O expansion adapter sharing the I/O bus with at least one PCIe adapter.

11. The method of claim 7, wherein the new request is generated in response to determining that the request is a write request.

\* \* \* \* \*